Dec. 8, 1936. M. E. WHITENACK 2,063,137
ELECTRIC CONTROL
Filed May 20, 1935 2 Sheets-Sheet 1
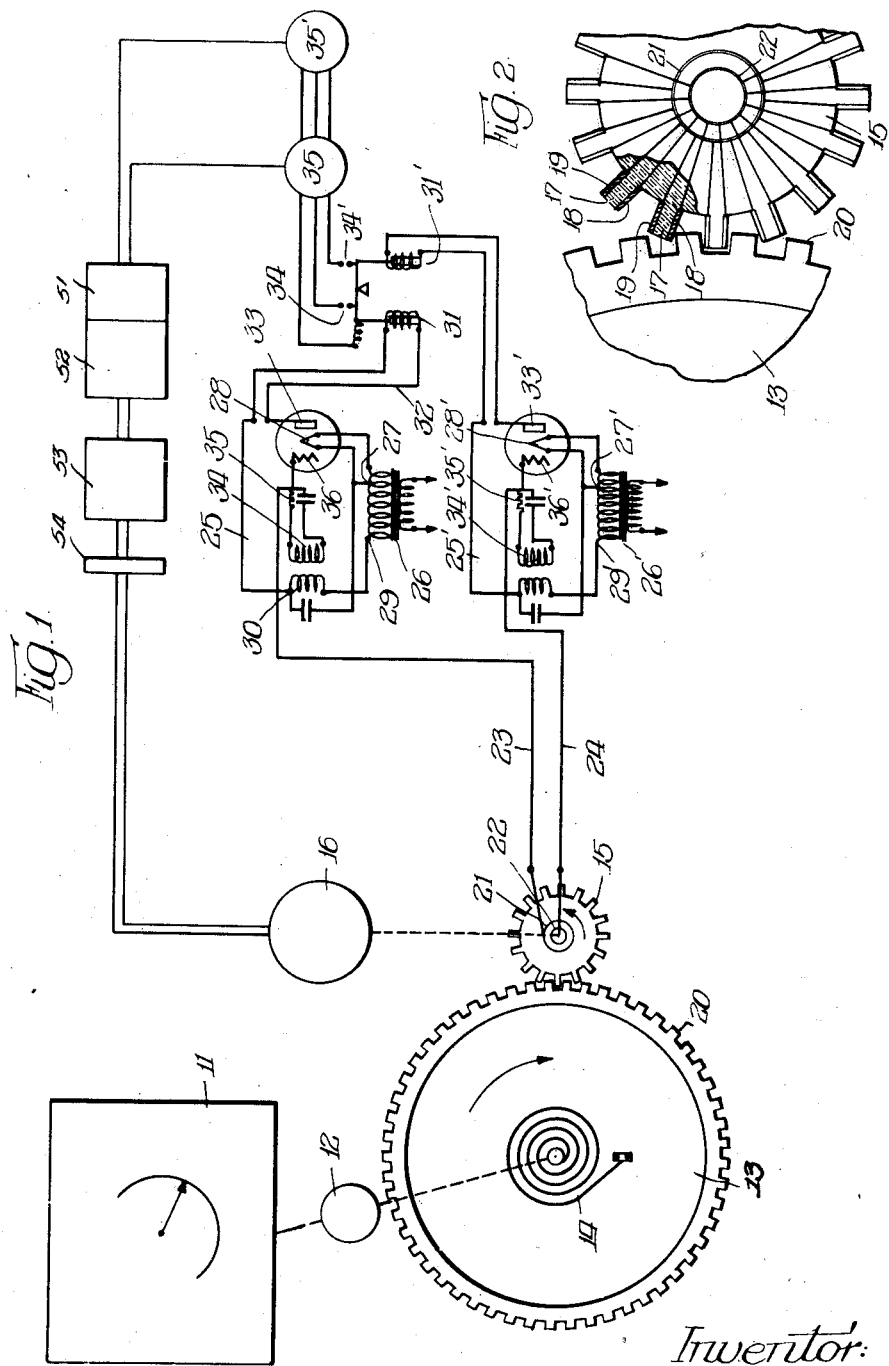
Inventor:
Mirl E. Whitenack,

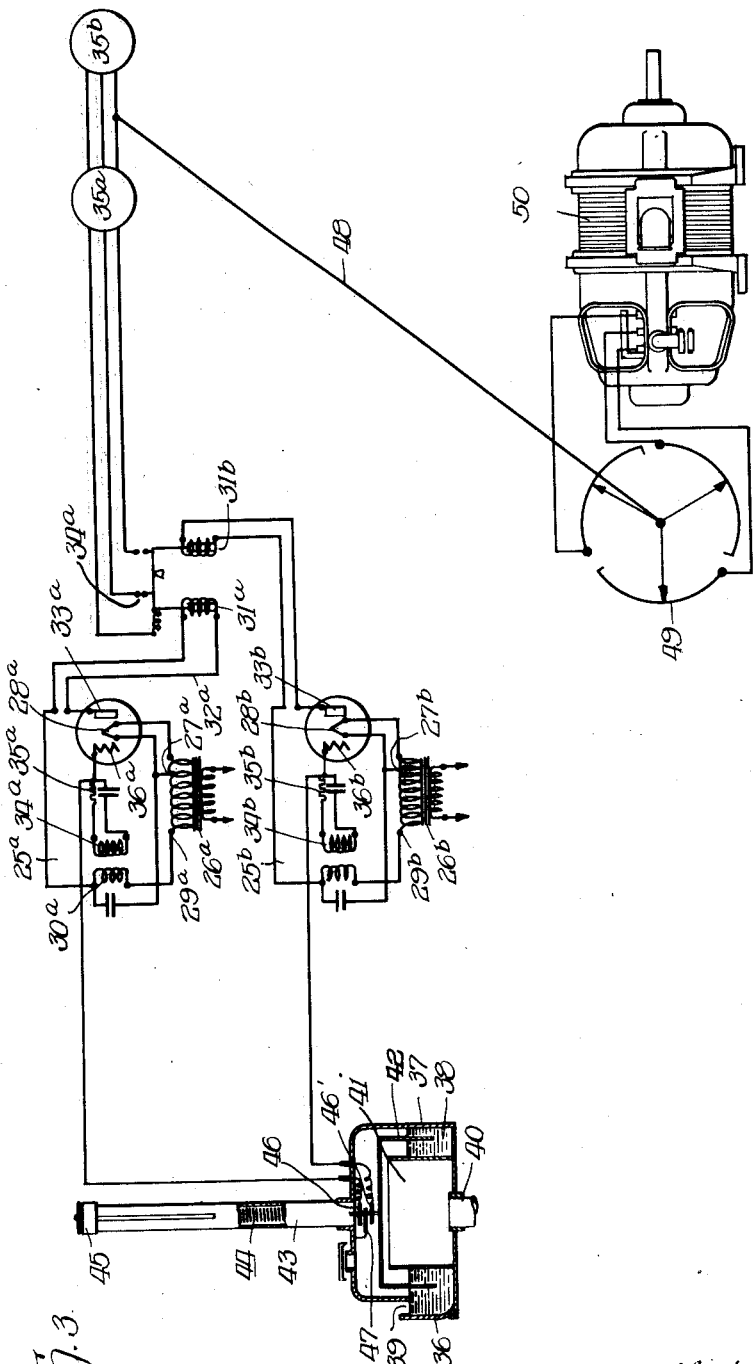

Patented Dec. 8, 1936

2,063,137

UNITED STATES PATENT OFFICE 2,063,137

ELECTRIC CONTROL

Mirl E. Whitenack, St. Louis, Mo., assignor to Whitenack Corporation, Chicago, Ill., a corporation of Illinois Application May 20, 1935, Serial No. 22,366

5 Claims. (Cl. 171—119)

The present invention relates to electric control devices and is particularly suitable for controlling the load borne by generators in interconnected power systems or for the accurate control of speed of operation of individual motors.

Reference will first be made to the control of inter-connected power systems. Considerable difficulty has been experienced in the past with the proper division of the load between generating units which are connected together by a tie line and of the tie line load. Obviously in any interconnected system if one generating unit lags slightly behind the remaining inter-connected unit or units the load will be borne by the unit or units which are operating at a slightly higher rate of speed, the system becomes out of balance and an undesirable tie line load results.

One of the primary objects of the present invention is the provision of control mechanism such that generating units are kept in step and the load is distributed properly throughout the system. For purposes of exemplification the circuit and mechanism employed are shown diagrammatically in the accompanying drawings.

Fig. 1 is a schematic drawing disclosing the relationship between the standard for maintaining frequency and the control mechanism for operating a generator of any single unit in an interconnected system;

Fig. 2 is a view in detail showing the capacity element used in the system; and

Fig. 3 illustrates diagrammatically the use of a control mechanism for the purpose of controlling the speed of a motor in response to changes in pressure of any system in connection with which the motor may be used.

It is to be understood that the drawings are for purposes of illustration only and the specific embodiments of the invention hereinafter described are not intended to unnecessarily restrict the scope of the appended claims. It will be obvious to those skilled in the art that alterations or changes can be made in details of construction and arrangement without departing from the true spirit and scope of the invention.

Referring to Fig. 1, the reference numeral 11 indicates a standard for maintaining frequency of which there are a number of types commonly in use in power stations. Connected to the standard through means of a shaft diagrammatically indicated at 12 is a gear wheel 13. The wheel 13 is rotatable on the shaft 12 but is caused to rotate with it through means of spring 14, one end of which is connected to the shaft 12 and the other affixed to the gear wheel 13. The purpose of this arrangement will be hereinafter described.

Meshed with the gear wheel 13 is a second gear 15 which is driven by a synchronous motor 16. The synchronous motor 16 may be supplied with energy from the bus-bars of a power house or otherwise connected in to the output side of the generator circuit. The gear wheel 15 is of peculiar construction, as is shown in detail in Fig. 2. The central portion of the gear 15 and the centers of the teeth 17 are constructed of fibre, bakelite or other insulating material. Mounted upon the inside faces of each tooth are two plates 18 and 19 which form in relation to the teeth 20 of the gear wheel 13 plates of a condenser.

It will be obvious from the foregoing that if the generator of the power station is operating in absolute unison with the standard for control of the frequency that there will be no contact between the teeth of the gear wheel 13 and the gear wheel 15 but the teeth of the gear wheel 15 will be spaced equidistant from the side walls of the teeth of the gear wheel 13. If for any reason, however, the generator lags or speeds up beyond the frequency set up by the standard the synchronous motor 16, being connected to the generator circuit, will increase or decrease in speed as the case may be and the plates 18 and 19 will be brought either closer to or apart from the side walls of the teeth 20 of the gear wheel 13. If the plate 18 is brought closer to the side walls of the teeth obviously the capacity of the plate 18 will be increased and the capacity of the plate 19 will be decreased.

The plates 18 and 19 are connected to slip rings 21 and 22, respectively, mounted on the gear wheel 15. From the slip rings 21 and 22 are the usual brushes and connecting lines 23 and 24. The connecting line 23 is connected to a thermionic tube circuit, indicated generally by the reference numeral 25.

The circuit indicated generally by the reference numeral 25 consists of a transformer 26 comprising the usual primary and secondary, the primary being connected to a suitable source of alternating current. Tapped off from one end of the primary, as indicated at 27, is a circuit leading to the filament 28 of a three-element tube. From the other end of the secondary 29 is a lead from the primary of the transformer 30 and thence to the solenoid 31. The circuit for the solenoid 31 is completed by a lead 32 to the plate 33 of the tube. The secondary 34 of the transformer 30 is connected through means of a grid leak 35 and the capacity to the grid 36. Inter-connected to this circuit is the lead 23 from the slip ring 21.

Obviously any change in capacity of the plate 19 will affect the potential on the grid 36 and thus affect the electron flow from the filament 28 to the plate 33 and since the solenoid 31 is energized by the circuit which includes the filament and plate of the tube the solenoid 31 is directly responsive to change in the grid potential.

The solenoid 31 operates a circuit breaker, indicated at 34, which circuit breaker is connected to the motor 35 so that when the solenoid 31 closes the contact 34 the motor 35 is caused to operate. The motor 35 is connected through means of suitable gearing to the governor or other control means indicated at 51 which determines the speed of the steam turbine or other source of power 52 that drives the generator 53. The generator 53, as is diagrammatically indicated, is connected to the usual bus bar system 54.

A similar circuit is connected from the line 24 which is connected to the slip ring 22, and the same parts are referred to in connection with this circuit by the same reference numerals plus the addition of a prime.

It will be apparent from the foregoing that in the event the generator begins to lag and the frequency in the line drops below that set by the standard the motor 16 will begin to slow up and the capacity of the plate 19 will be increased to close the circuit breaker 34 and energize the motor 35 which in turn will operate the control mechanism of the steam turbine to increase the speed of the generator and conversely, when the generator attains proper speed, the teeth of the gear 15 will ride equidistant from the teeth of the gear 13, the motor 35 will be cut out and the generator will continue at the same speed until there is some change in the demand. Should the generator run ahead of the standard then the capacity of the plates 18 and the line 24 will be increased and the circuit breaker 34' will energize the motor 35' to operate the inter-connected mechanism to decrease the speed of the turbine and generator.

In connection with the use of this device in inter-connected systems such control mechanism is located at each generating station, the standard for establishing the frequency is inter-connected so as to operate in unison and thus the entire system will be kept in step and the load evenly distributed over the system and the tie line load will be maintained in the balance unless for some reason one of the generating units should have trouble or be called upon to supply an excessive demand in which event the other units will automatically take up the load without any undue strain at any point in the system.

The spring connection 14 between the shaft 12 and the gear wheel 13 is provided so that in the event the generator should become completely out of step there will be no injury to the unit and the capacity of the proper plate, either 18 or 19, will be increased for such time as it takes for the generator to get in step and to assume the proper proportion of the load in the system.

With reference to the modification of the control illustrated in Fig. 3, this is shown to demonstrate other uses to which the control may be put other than in inter-connected generating systems. In this case, for instance, the control is called upon to maintain the speed of a motor in response to pressure developed in a system to which the motor is connected. As shown at 36 a pressure-responsive mechanism is provided consisting of a casing 37 the bottom portion of which is filled with liquid 38, such as oil or mercury. The fluid 38 is exposed to the atmosphere at 39. Mounted in the central portion of the casing is an inlet 40 which is connected to a line under pressure so that the pressure in the line is transmitted within the chamber 41. Extending over the top of the chamber 41 and into the sealing fluid 38 is a bell-shaped member 42. It is obvious that any change in pressure within the chamber 41 will cause the bell-shaped member 42 to raise or lower in response to such a change.

Extending upwardly from the member 42 is a rod 43, upward movement of which is opposed by the spring 44. The tension of the spring 44 is controlled by a screw adjustment 45. Mounted on the rod 43 are two condenser plates 46 and 46', respectively, and positioned between these condenser plates is a common condenser plate 47 so that upon movement of the rod 43 either the capacity of the condenser plate 46 or 46' is increased and in the event that one is increased the other one is decreased.

Connected to the condenser plates 46 and 46' are two thermionic tube circuits identical with those described in Fig. 1 and corresponding parts have been indicated by the same numbers plus the addition of the letters "a" and "b" for each circuit. One of these circuits operates the motor 35a and the other the motor 35b. The motors 35a and 35b are connected through means of the shaft 48 to a resistance member or similar control mechanism 49, which is effective to vary the resistance across the slip rings of the motor 50.

It is obvious that upon rotation of the motor 35a the amount of resistance will be increased and upon rotation of the motor 35b the amount of resistance will be decreased. Thus the speed of the motor 50 is directly responsive to the pressure in the line 40.

Such devices are particularly useful in connection with mechanisms for controlling pressures of fluid and liquids where it is desirable to maintain an absolutely constant pressure.

Another modification of the invention which may be made consists in the use of only a single circuit comprising one tube instead of the use of a double circuit comprising two tubes, as hereinbefore described. This is readily accomplished by substituting for one of the relays a spring or other mechanism which tends to operate against a single relay.

It has been found that the controls embodying the invention are extremely sensitive and that they respond almost instantaneously to any change in conditions.

I claim:

1. An electrical control for generating systems comprising a standard, a variable capacity element having one plate thereof actuated by said standard and the second plate thereof actuated by means responsive to the output of said generator system, a thermionic tube circuit with said variable capacity element connected in the grid circuit thereof, means energized by the flow of current from the output circuit of said tube in response to change in the capacity of said capacity element for varying the power applied to said generating system.

2. An electrical control for generating systems comprising a standard, a variable capacity element composed of a gear with spaced teeth and a second gear having the teeth thereof formed with an insulating central portion and plate portions on the inside faces thereof, said second mentioned gear being operatively associated with said first mentioned gear, said first mentioned gear being driven by said standard and said second mentioned gear being driven by means responsive to the frequency at which the generator system is operating, said variable capacity element being connected in the grid circuit of a thermionic tube to vary the grid potential thereof, means responsive to the flow of current from the output of said tube for controlling the operation of a generator.

3. An electrical control for generating systems consisting of a number of generators connected by a tie line, a standard, a variable capacity element for each generator unit, said variable capacity elements being responsive to differential between the output of the associated generating unit and the standard, a thermionic tube circuit including in the grid portion thereof said variable capacity element and in the output circuit thereof, means for controlling the individual generator units.

4. An electrical control for generating systems comprising a standard, a rotary variable capacity element having a plurality of spaced apart plates and a complementary element, a driving connection between said standard and one set of plates, means for driving said complementary element responsive to the frequency at which the generating system is operating, a thermionic tube having a control electrode, said control electrodes being connected in a circuit with said capacity elements, means responsive to the flow of current from the output of said tube to control the operation of the connected generator.

5. An electrical control for generating systems comprising a standard, a gear-shaped rotary variable capacity element having spaced teeth and a second gear-shaped member having the teeth thereof formed with a dielectric central portion and plate portions on the inside faces thereof, said second mentioned gear-shaped member being operatively associated with said first mentioned member, said rotary variable capacity elements being driven by said standard and by means responsive to the frequency at which the generating system is operating, and yieldable resilient means interposed in said driving connections, said variable capacity element being connected to the control electrode circuit of a three-element tube, means responsive to the flow of current from the output of said tube for controlling the operation of the generator.

MIRL E. WHITENACK.